US011531915B2

(12) United States Patent
Hetherington et al.

(10) Patent No.: US 11,531,915 B2
(45) Date of Patent: Dec. 20, 2022

(54) METHOD FOR GENERATING RULESETS USING TREE-BASED MODELS FOR BLACK-BOX MACHINE LEARNING EXPLAINABILITY

(71) Applicant: Oracle International Corporation, Redwood Shores, CA (US)

(72) Inventors: Tayler Hetherington, Vancouver (CA); Zahra Zohrevand, Vancouver (CA); Onur Kocberber, Baden-Daettwil (CH); Karoon Rashedi Nia, Vancouver (CA); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 656 days.

(21) Appl. No.: 16/359,256

(22) Filed: Mar. 20, 2019

(65) Prior Publication Data
US 2020/0302318 A1    Sep. 24, 2020

(51) Int. Cl.
*G06N 5/04*     (2006.01)
*G06N 20/00*    (2019.01)

(52) U.S. Cl.
CPC ............ *G06N 5/046* (2013.01); *G06N 20/00* (2019.01)

(58) Field of Classification Search
CPC ........ G06N 5/046; G06N 20/00; G06N 5/003; G06N 5/045; G06N 20/20; G06N 5/025
See application file for complete search history.

(56) References Cited

U.S. PATENT DOCUMENTS

| 10,705,796 B1* | 7/2020 | Doyle | .................... G06N 5/003 |
| 2013/0085978 A1* | 4/2013 | Goyal | .................. G06F 3/0629 |
| | | | 706/47 |

(Continued)

FOREIGN PATENT DOCUMENTS

WO    WO-2018006004 A1 *    1/2018

OTHER PUBLICATIONS

Weirong Jiang, Viktor K. Prasanna. Scalable Packet Classification on FPGA. IEEE Transactions on Very Large Scale Integration (VLSI) Systems, vol. 20, No. 9, Sep. 2012 (Year: 2012).*

(Continued)

*Primary Examiner* — Nicholas Klicos
*Assistant Examiner* — Paul Gordon Smith
(74) *Attorney, Agent, or Firm* — Hickman Becker Bingham Ledesma LLP; Brian N. Miller

(57) ABSTRACT

Herein are techniques to generate candidate rulesets for machine learning (ML) explainability (MLX) for black-box ML models. In an embodiment, an ML model generates classifications that each associates a distinct example with a label. A decision tree that, based on the classifications, contains tree nodes is received or generated. Each node contains label(s), a condition that identifies a feature of examples, and a split value for the feature. When a node has child nodes, the feature and the split value that are identified by the condition of the node are set to maximize information gain of the child nodes. Candidate rules are generated by traversing the tree. Each rule is built from a combination of nodes in a tree traversal path. Each rule contains a condition of at least one node and is assigned to a rule level. Candidate rules are subsequently optimized into an optimal ruleset for actual use.

23 Claims, 8 Drawing Sheets

(56) References Cited

U.S. PATENT DOCUMENTS

| | | | | |
|---|---|---|---|---|
| 2013/0218853 A1* | 8/2013 | Bullis | ................ | H04L 43/18 |
| | | | | 707/694 |
| 2018/0349986 A1 | 12/2018 | Fidanza et al. | | |
| 2019/0197357 A1 | 6/2019 | Anderson et al. | | |
| 2020/0118036 A1 | 4/2020 | Karnagel | | |
| 2021/0232978 A1* | 7/2021 | Cai | ................ | G06N 5/003 |

OTHER PUBLICATIONS

M. Asadpour, M. N. Ahmadabadi and R. Siegwart, "Heterogeneous and Hierarchical Cooperative Learning via Combining Decision Trees," 2006 IEEE/RSJ International Conference on Intelligent Robots and Systems, 2006, pp. 2684-2690, doi: 10.1109/IROS.2006.281990. (Year: 2006).*

W. Duch, R. Setiono and J. M. Zurada, "Computational intelligence methods for rule-based data understanding," in Proceedings of the IEEE, vol. 92, No. 5, pp. 771-805, May 2004, doi: 10.1109/JPROC.2004.826605. (Year: 2004).*

Prasad et al., "Distributed Feature Selection Using Vertical Partitioning for High Dimensional Data", ICACCI, dated Sep. 12, 2016, 8 pages.

Moran-Fernandez et al., "Centralized vs. Distributed Feature Selection Methods Based on Data Complexity Measures", Knowledge-based Systems, dated Sep. 28, 2016, 20 pages.

Bolon-Canedo et al., "Distributed Feature Selection: An Application to Microarray Data Classification", Applied Soft Computing, dated Feb. 7, 2015, 16 pages.

Lakkaraju et al., "Interpretable Decision Sets: A Joint Framework for Description and Prediction", KDD '16, Aug. 13-17, 2016, San Francisco, CA, USA, 10 pages.

Agrawal et al., "Fast Discovery of Association Rules", dated 1996, 22 pages.

Albon, Chris, "ANOVA F-Value for Feature Selection", dated Dec. 20, 2017, 2 pages.

Baehrens et al., "How to Explain Individual Classification Decisions", Journal of Machine Learning Research 11 dated 2010, 29 pages.

Brown et al., "Conditional Likelihood Maximisation: A Unifying Framework for Information Theoretic Feature Selection", Journal of Machine Learning Research 13 (2012), 40 pages.

Chandrashekar et al., "A survey on feature selection methods", Computers and Electrical Engineering 40 dated 2014, 13 pages.

Dougherty et al., "Supervised and Unsupervised Discretization of Continous Features", dated 1995, 9 pages.

Fayyad, "Multi-Interval Discretization of Continuous-Valued Attributed for Classification Learning", dated 1993, 6 pages.

Goodfellow et al., "Explaining and Harnessing Adversarial Examples", Published as a conference paper at ICLR dated 2015, 11 pages.

Guyon et al., "An Introduction to Variable and Feature Selection", Journal of Machine Learning Research 3 dated 2003, 26 pages.

Holte, Robert, "Very Simple Classification Rules Perform Well on Most Commonly Used Datasets", 1993 Kluwer Academic Publishers, Boston. Manufactured in The Netherlands, 28 pages.

Hutter et al., "Automatic Machine Learning: Methods, Systems, Challenges", dated Oct. 16, 2018, 250 pages.

Jin et al., "Data discretization unification", Regular Paper, Springer-Verlag London Limited 2008, 29 pages.

"Decision Trees", dated Jan. 26, 2005, 10 pages.

Lakkaraju et al., "Interpretable & Explorable Approximations of Black Box Models", KDD, dated 2017, 5 pages.

Utgoff, Paul, "Incremental Induction of Decision Trees", 1989 Kluwer Academic Publishers, Boston. Manufactured in The Netherlands, 26 pages.

Lakkaraju et al., "Interpretable Decision Sets: A Joint Framework for Description and Prediction", KDD, PMC dated Nov. 14, 2016, 24 pages.

Letham et al., "Interpretable Classifiers Using Rules and Bayesian Analysis: Building a Better Stroke Prediction Model", The Annals of Applied Statistics, dated 2015, vol. 9, No. 3, 23 pages.

Letham et al., "Interpretable classifiers using rules and Bayesian analysis: Building a better stroke prediction model", vol. 9, No. 3, dated 2015, 2 pages.

Lin et al., "Experiencing SAX: a novel symbolic representation of time series", Data Min Knowl Disc (2007), 38 pages.

Microsoft Docs, "Feature Selection Modules", dated May 5, 2019, 7 pages.

Molina et al., "Feature Selection Algorithms: A Survey and Experimental Evaluation", dated 2002, 19 pages.

Narendra et al., "A Branch and Bound Algotithm for Feature Subset Selection", IEEE Transactions on Computers, vol. C-26, No. 9, dated Dec. 1977, 6 pages.

Pudil et al., "Floating Search Methods in Feature Selection", dated Jun. 19, 1993, 9 pages.

Quinlan et al., "Induction of Decision Trees", dated 1986 Kluwer Academic Publishers, Boston—Manufactured in The Netherlands, 26 pages.

Ramírez-Gallego et al., "Data discretization: taxonomy and big data challenge", WIREs Data Mining Knowl Discov 2015, 17 pages.

Ribeiro et al., "Why Should I Trust You?" Explaining the Predictions of Any Classifier, Publication rights licensed to ACM, dated 2016, 10 pages.

Robnik-Sikonja et al., "Explaining Classifications for Individual Instances", IEEE Transactions on Knowledge and Data Engineering, 20:589-600, dated 2008, 24 pages.

Samek et al., "ExplainableArtificialIntelligence: Understanding, Visualizingand Interpreting Deep Learning Models", ITU Journal: ICT Discoveries, Special Issue No. 1, Oct. 13, 2017, 10 pages.

Kohavi, Ron, "Wrappers for Performance Enhancement and Oblivious Decision Graphs", dated Sep. 1995, 304 pages.

Plumb et al., "Model Agnostic Supervised Local Explanations", 32nd Conference on Neural Information Processing Systems (NeurIPS 2018), dated 2018, Montréal, Canada, 10 pages.

Dhurandhar et al., "Explanations based on the Missing: Towards Contrastive Explanations with Pertinent Negatives", dated 2018, 12 pages.

Egan et al., "Generalized Latent Variable Recovery for Generative Adversarial Networks", dated Oct. 19, 2018, 9 pages.

Goodfellow et al., "Generative Adversarial Nets", dated 2014, 9 pages.

Heusel et al., "GANs Trained by a Two Time-Scale Update Rule Converge to a Local Nash Equilibrium", 31st Conference on Neural Information Processing Systems (NIPS 2017), Long Beach, CA, USA, 12 pages.

Laugel et al., "Comparison-based Inverse Classification for Interpretability in Machine Learning"., (IPMU 2018), dated Jun. 2018, Cadix, Spain, 13 pages.

Laugel et al., "Defining Locality for Surrogates in Post-hoc Interpretablity", dated Jun. 19, 2018 ICML Workshop on Human Interpretability in Machine Learning (WHI 2018), 7 pages.

Lipton et al., "Precise Recovery of Latent Vectors From Generative Adversarial Networks", Workshop track—ICLR dated Feb. 17, 2017, 4 pages.

Bloniarz et al., "Supervised Neighborhoods for Distributed Nonparametric Regression", Proceedings of the 19th International Conference on Artificial Intelligence and Statistics dated 2016, 10 pages.

Pedregosa et al., "Scikit-learn: Machine Learning in Python", Journal of Machine Learning Research 12, dated 2011, 6 pages.

Zhao et al., "Data-driven risk-averse stochastic optimization with Wasserstein metric", Operations Research Letters, dated 2018, 6 pages.

Ribeiro et al., "Why Should I Trust You? Explaining the Predictions of Any Classifier", KDD dated 2016 San Francisco, CA, USA, 10 pages.

Roth, Alvin, "The Shapley Value", Essays in honor of Lloyd S. Shapley, Cambridge University Press, dated 1988, 338 pages.

Strumbelj et al., "An Efficient Explanation of Individual Classifications Using Game Theory", Journal of Machine Learning Research 11, dated 2010, 18 pages.

(56) References Cited

OTHER PUBLICATIONS

Sweke et al., "On the Quantum versus Classical Learnability of Discrete Distributions", dated Jul. 28, 2020, 27 pages.
Van Looveren et al., "Interpretable Counterfactual Explanations Guided by Prototypes", dated Feb. 18, 2020, 17 pages.
Vanschoren et al., "OpenML: Networked Science in Machine Learning", dated Aug. 1, 2014, 12 pages.
Wachter et al., "Counterfactual Explanations Without Opening the Black Box: Automated Decisions and the GDPR", dated 2017, 52 pages.
Xu et al., "Modeling Tabular Data using Conditional GAN", 33rd Conference on Neural Information Processing Systems (NeurIPS 2019), dated 2019, Vancouver, Canada, 11 pages.
Lundberg et al., "A Unified Approach to Interpreting Model Predictions", 31st Conference on Neural Information Processing Systems (NIPS 2017), dated 2017, Long Beach, CA, USA, 10 pages.

\* cited by examiner

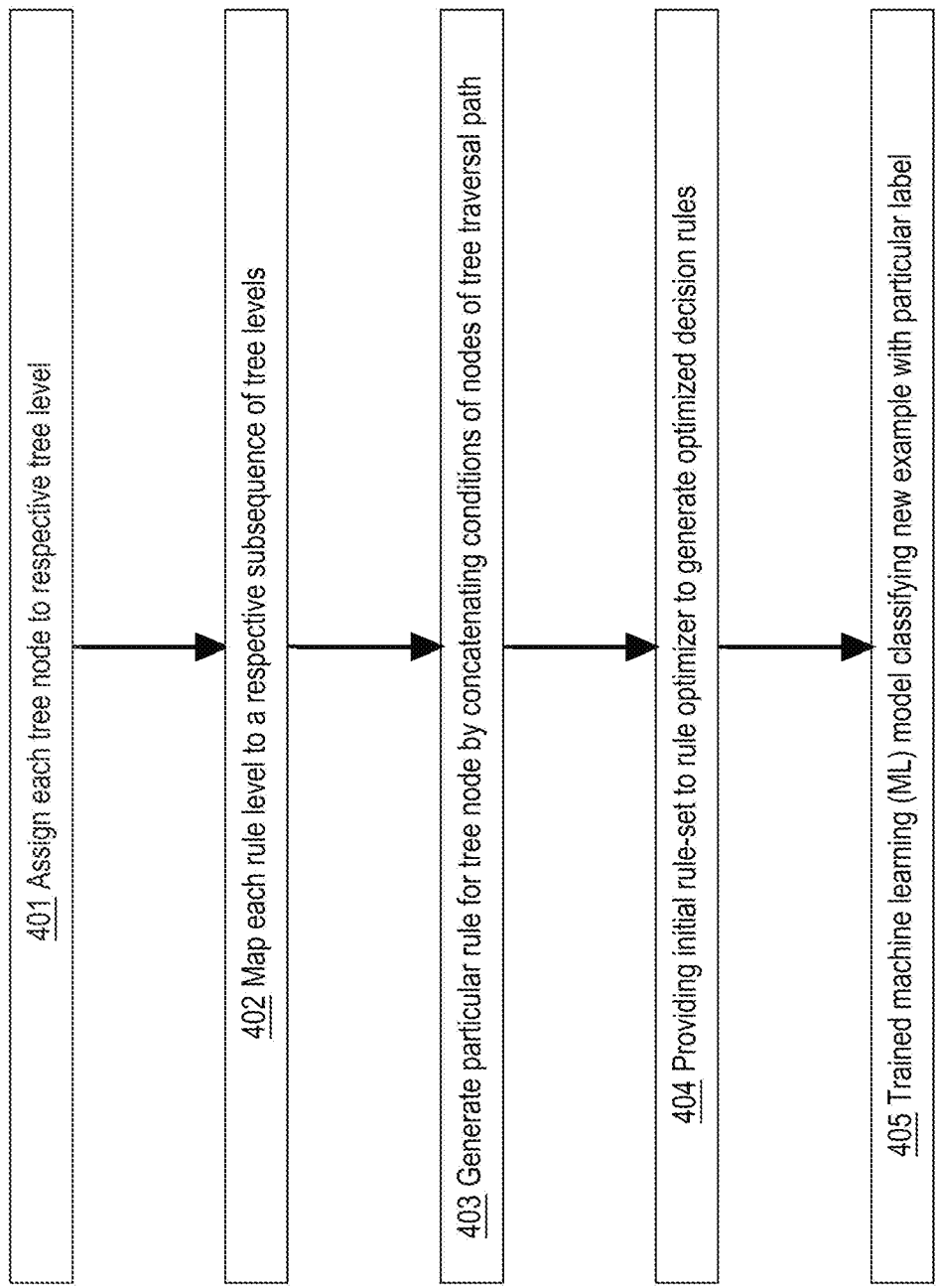

FIG. 5 COMPUTER 500

NODE 511
| EXAMPLES | 0, 1, 2, 3, 4, 5, 6, 7 |
| CLASSIFICATIONS | 3 PA + 3 FA + 2 IG |
| GINI | 0.656 |
| LABELS | PASS, FAIL |
| CONDITION | B = 4 |

YES → NODE 512
| | 0, 6, 7 |
| | 2 PA + 1 FA + 0 IG |
| | 0.444 |
| | PASS, FAIL |
| | A = BLUE |

YES → NODE 513
| | 0, 7 |
| | 1 PA + 1 FA + 0 IG |
| | 0.5 |
| | PASS, FAIL |
| | C = 32.0 |

YES → FAIL 7
NO → PASS 0

NODE 512 NO → PASS 6

NODE 511 NO → NODE 514
| | 1, 2, 3, 4, 5 |
| | 1 PA + 2 FA + 2 IG |
| | 0.64 |
| | FAIL, IGNORE |
| | B = 2 |

YES → NODE 515
| | 1, 3, 4, 5 |
| | 1 PA + 2 FA + 1 IG |
| | 0.625 |
| | FAIL |
| | A = YELLOW |

NODE 514 NO → IGNORE 2

NODE 515 YES → NODE 516
| | 1, 5 |
| | 0 PA + 1 FA + 1 IG |
| | 0.5 |
| | FAIL, IGNORE |
| | C = -1.1 |

YES → FAIL 1
NO → IGNORE 5

NODE 515 NO → NODE 517
| | 3, 4 |
| | 1 PA + 1 FA + 0 IG |
| | 0.5 |
| | PASS, FAIL |
| | A = GREEN |

YES → PASS 3
NO → FAIL 4

CLASSIFICATIONS 520

| EXAMPLE | | | | LABEL |
|---|---|---|---|---|
| ID | FEATURE A | FEATURE B | FEATURE C | |
| 0 | BLUE | 4 | -22.3 | PASS |
| 1 | YELLOW | 2 | -1.1 | FAIL |
| 2 | BLUE | 5 | 54.5 | IGNORE |
| 3 | GREEN | 2 | -33.3 | PASS |
| 4 | ORANGE | 2 | 32.1 | FAIL |
| 5 | YELLOW | 2 | 32.0 | IGNORE |
| 6 | YELLOW | 4 | 32.0 | PASS |
| 7 | BLUE | 4 | 32.0 | FAIL |

FIG. 6

$$Gain(D_P) = Entropy(D_P) - \frac{N_{left}}{N_P} Entropy(D_{left}) - \frac{N_{right}}{N_P} Entropy(D_{right})$$

METHOD FOR GENERATING RULESETS USING TREE-BASED MODELS FOR BLACK-BOX MACHINE LEARNING EXPLAINABILITY

FIELD OF THE INVENTION

The present invention relates to machine learning explainability (MLX). Herein are techniques for generating, as input to a rules optimizer, an improved initial set of explanatory rules from a decision tree that is based on classifications by a machine learning (ML) model.

BACKGROUND

Machine learning (ML) and deep learning are becoming ubiquitous for two main reasons, which include their ability to solve complex problems in a variety of domains and the growth in the performance and efficiency of computers to support ML. However, as the complexity of problems continue to increase, so too does the complexity of the ML models applied to these problems. Deep learning is a prime example of this trend. Traditional machine learning algorithms, such as neural networks, may only contain a few layers of densely connected neurons, whereas deep learning algorithms, such as convolutional neural networks, may contain tens to hundreds of layers of neurons performing vastly different operations. Increasing the depth of the model and heterogeneity of layers provides many benefits. For example, neural depth can increase the capacity of the model, improve the generalization of the model, and provide opportunities for the model to filter out unimportant features. Including layers that perform different operations can greatly improve the performance of the model. However, these optimizations come at the cost of increased complexity.

Explaining and interpreting the results from complex deep learning models is a challenging task compared to many traditional machine learning models. For example, consider a simple linear regression model with N input features. Once trained, the resulting model is simply a dot product of an N-dimensional sample feature vector and the learned model weights, along with an offset. Understanding the importance of features and how they contribute to the model's prediction is straightforward; the larger the feature weight, the larger the impact that feature has on the output of the model. As another example, consider a binary classification decision tree with N input features. During training, the features that have the largest impact on the class predictions are inserted near the root of the tree, while the features that have less impact on class predictions fall near the leaves of the tree.

Importance of a feature for a tree node can be determined by measuring the ability of a selected value of the feature to optimize the entropy or impurity, as explained later herein, of a class split at that node. Feature importance can be determined by evaluating the distance of a node to the root of the tree. Such tree models may be inherently interpretable. Whereas, even relatively simple neural networks with a few layers can be challenging to interpret, as multiple layers combine the effects of features and increase the number of operations between the model inputs and outputs. Consequently, there is a requirement for alternative techniques to aid with the interpretation of complex deep learning models.

Machine learning explainability (MLX) for explainable artificial intelligence (XAI) is the process of explaining and interpreting machine learning and deep learning models. MLX can be broadly categorized into two categories: local and global. Local MLX aims to explain why the model made a specific prediction corresponding to a given sample. The explanation is often presented as a list of features ordered by their importance to a given prediction. This can be achieved through many different techniques. For example, LIME approximates the local behavior of a black-box model by fitting a simple interpretable machine learning model, such as a linear model or decision tree, to a large set of generated samples in a local region surrounding the original sample to explain.

As described above, the feature importances can easily be extracted from the simple interpretable model, which are an estimate of the feature importances of the original black-box model for a specific sample. While the black-box model may be too complex to approximate with a simple interpretable model, the local behavior of the black-box model may be much easier to approximate. Another example of local MLX is the Shapley Value, which borrows concepts from game theory to assign feature importance values based on their contributions to the black-box model's prediction for a given sample. Shapley values provide theoretical guarantees on the resulting relative feature importances. There are multiple different techniques for computing or approximating the Shapley Values, such as Kernel SHAP, which expands on LIME to compute the Shapley Values using weighted linear regression, or Sampling SHAP, which approximates the Shapley Values through Monte Carlo sampling.

Global MLX, on the other hand, aims to provide an interpretable explanation for the model behavior as a whole. That can be challenging, since the complexity of the black-box model is often fundamental to achieving high performance an ML task. Expanding on local MLX, a global view of feature importance can be built up from multiple local explanations. For example, local feature importance values can be computed for all samples in a dataset and aggregated together to understand which features tend to be most important on average. Other global MLX techniques, such as IDS and BETA, attempt to directly describe the global behavior of a black-box model using a set of rules in plain English. These techniques are referred to in this invention disclosure as "ruleset-based" MLX techniques.

Providing explanations for complex machine learning and deep learning models has significant business value. While it is important for the machine learning model to have high prediction accuracy, it is equally as important for a user to be able to understand why the model made this prediction. For example, consider a machine learning task used to predict if a patient requires a specific medication or not, given input features about the patient's health and history. In such a case, it is very important to understand why the machine learning model made a given prediction for a doctor to trust the model. Furthermore, recent laws, such as the European Union's "Right to an explanation", require that people be provided with an explanation for the decision of a prediction algorithm (e.g., machine learning task). Thus, it may be necessary to be able to understand why a model makes a given prediction for machine learning to be accepted in various aspects of society.

Some MLX is rules based. Some techniques generate rules directly from a decision tree, which may not scale in practice. For example, a tree of tens or even hundreds of levels may be needed to capture nuances of a typical features space. The state of the art still needs heuristics for tree flattening, and straightforward flattening yields too many rules and rules that are too complex to readily understand. In order to be useable, a generated explanation should accurately explain the behavior of the machine learning model, should be easy to understand, and should not be prohibitively expensive to generate an explanation. Understandability is at stake because the number of rules needed to abstract an ML model grows exponentially with the number of features and possible values for each feature. Furthermore, a feature may have a continuous range of values, such as a floating point number, which has a potentially infinite set of values to consider. Thus, the combinatorics of explanation rule optimization may be more or less intractable.

BRIEF DESCRIPTION OF THE DRAWINGS

In the drawings:

FIG. 4 is a flow diagram that depicts an example computer process for mapping tree levels to rule levels;

FIG. 5 is a block diagram that depicts a computer that populates a decision tree based on entropy and non-binary labels;

FIG. 6 depicts calculation of information gain;

DETAILED DESCRIPTION

Figure 1:
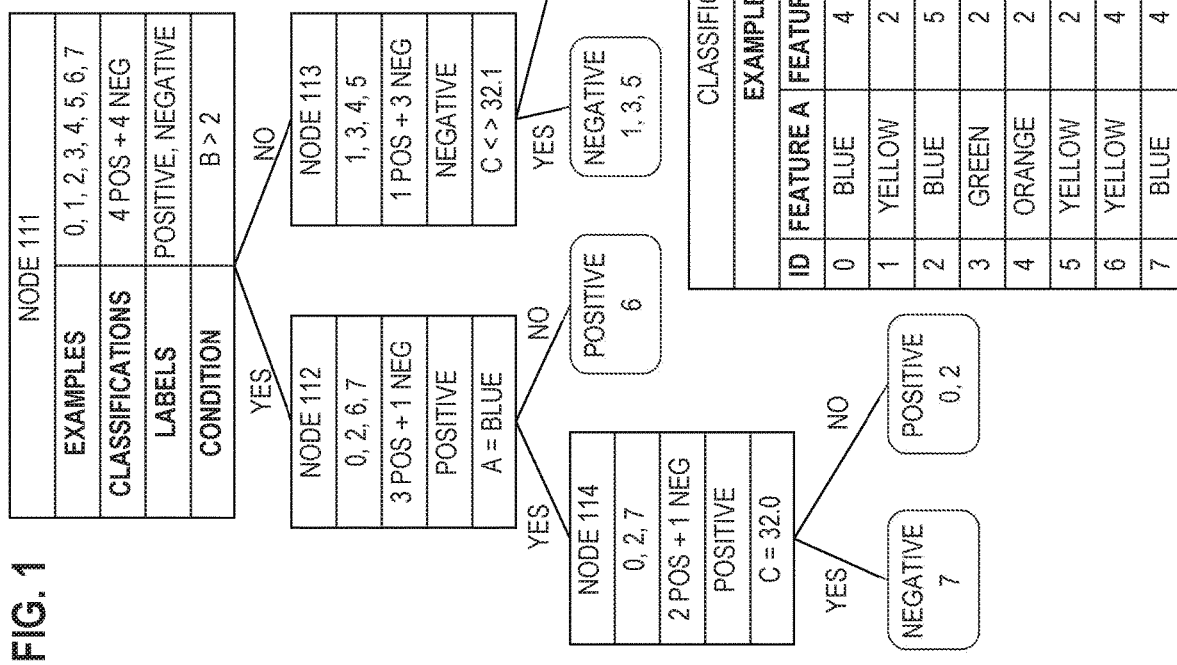
FIG. 1 is a block diagram that depicts an example computer that generates explanatory rules from a decision tree that is induced from classifications by a machine learning (ML) model.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are techniques to generate candidate rulesets for machine learning (ML) explainability (MLX) for black-box ML models. A candidate ruleset, as generated herein, may subsequently be optimized into a final ruleset for MLX. Rule optimization algorithms take a large number of possible rules and optimize them by distilling them down to a more or less minimal set based on various granularity and numerosity constraints, such as human usability requirements. Techniques herein generate an improved initial candidate set of rules to provide to a best of breed optimization algorithm. When combined with subsequent optimization, techniques herein improve fidelity, performance, and interpretability over other techniques for constructing candidate rulesets as input to ruleset optimization algorithms.

A tree-based representation of the actual performance of a ML model is used to select representative features and corresponding feature transition points that most influence the black-box model's target value prediction (i.e. classification). Special improvements are achieved by the tree-based candidate ruleset generation techniques herein. These techniques select features and split values that more accurately capture the behavior of the input features relative to the target output variables (i.e. classifications).

These improvements are empirically validated by measuring the f1-score, coverage, and normalized number of rules of techniques herein versus the state of the art. The f1-score is a measurement of the fidelity of the optimized ruleset compared to the output of the black-box model such as an AutoEncoder. The normalized rule count measures the number of rules in the optimized ruleset, normalized to the maximum number of rules seen for this dataset in experiments.

Techniques herein significantly increase the f1-score and increase the coverage of the optimized ruleset. Additionally, the number of rules in the optimized ruleset is reduced. Furthermore, post processing by a rule optimizer such as BETA is accelerated by an initial ruleset that is generated by techniques herein. BETA's optimization time is significantly reduced from approximately two hours to one minute in one experiment. These results highlight the ability for tree-based candidate ruleset generation techniques herein to improve the fidelity of the optimized ruleset with the black-box model, improve BETA's optimization runtime, and increase the interpretability of the optimized ruleset by generating a fewer number of representative candidate rules as input to the ruleset-based global MLX technique.

In an embodiment, a computerized machine learning (ML) model generates classifications. Each classification associates a distinct example with a label. A decision tree that contains tree nodes is received or generated. Each tree node of the decision tree contains, based on the classifications, one or more labels, a condition that identifies a feature of examples, and a split value for the feature. When a tree node has child tree nodes, then the feature and the split value that are identified by the condition of the tree node are set to maximize, based on the classifications, information gain of the child tree nodes. Candidate decision rules are generated by traversing the tree. Each rule is built from one or more combinations of a subset of nodes in a traversal path of the tree. This improves on other existing techniques used to generate the candidate rulesets, such as by histogram binning and/or frequent itemset mining. As generated herein, each decision rule contains a condition of at least one tree node and is assigned to a respective rule level of a sequence of nested rule levels. These candidate rules are initial rules that are subsequently optimized into an optimal ruleset for actual use.

As generated herein, a candidate ruleset may contain many rules of various sizes and those rules may somewhat contradict each other. For example, there may initially be overlapping rules or duplicate rules having opposite target label predictions. In an embodiment, a subsequent optimization algorithm may filter a ruleset candidate. Initial rules are organized into levels for a rule optimizer to consider. When the input candidate ruleset is smaller and more representative, as achieved herein, the optimizer runs faster and generates an optimized (i.e. more comprehensible and accurate) ruleset.

1.0 Example Computer

FIG. 1 is a block diagram that depicts an example computer 100, in an embodiment. Computer 100 generates explanatory rules from a decision tree that is induced from classifications by a machine learning (ML) model. Computer 100 may be one or more of a rack server such as a blade, a personal computer, a mainframe, or other computing device.

An already trained ML model (not shown) generates classifications 130 by inferencing examples 0-7. Each row 0-7 of classifications 130 represents a distinct example. Each example 0-7 is a complex (i.e. multidimensional) input such as an image, a record, or other detailed object.

Each example 0-7 has values for features such as A-C. Feature A is categorical with predefined discrete symbolic values. For example, feature A may be color. For example, example 0 is blue for feature A. In an embodiment, the values of categorical feature A may instead be represented as ordinal integers.

Features B-C are numeric, each with a respective predefined range. Feature B has integer values. Feature C has floating point values of a continuous range.

In other techniques, the value range of a feature may be simplified, such as according to subranges, such as with histogram bins. For example, feature C may be divided into three bins with subranges of (−100, −33], (−33, 33), [33, 100). In some other techniques, bins have subranges of equal extent.

In some other techniques, bins have varied subranges that achieve equal densities (i.e. populations). In some other techniques, bins have subranges that correspond to standard variances or deviations of a normal (i.e. idealized) distribution, such that central bins have smaller subranges than tail bins. Obscurity is a consequence of binning, such that a value that is very important threshold (i.e. separator) around which alternate classifications (and explanations of classifications) arise may be buried within a bin of less critical (e.g. insignificant) values.

Thus, binning and other ways of simplifying value ranges may lose points of criticality (i.e. critical feature values) that would be essential to explaining classifications. Other techniques rely on such simplifications. Whereas, techniques herein operate well with raw values of any (e.g. continuous) natural range.

During inferencing, the ML model classifies each example 0-7, which entails associating each example with one of several predefined mutually-exclusive labels. For example, each of examples 0-7 is classified/labeled as either positive or negative. For example, the ML model may have been already trained to recognize suspicious, defective, or otherwise interesting examples and label those as positive. The ML model labels other examples as negative. This example entails binary classification. More diverse classification is discussed later herein.

Classifications 130 may be a tabular data structure, such as shown, or column vectors, or other data aggregation that is populated by the ML model during classification. In an embodiment, the ID column of classifications 130 is implied (i.e. demonstrative) and not actually stored. Classifications 130 may be persisted to a file or transmitted over a computer network to a remote data sink. After classification, an embodiment discards raw examples 0-7 (e.g. images), because techniques herein may operate with only the tabular data of classifications 130. However, a user may want explanations to refer to raw examples, in which case an embodiment may provide a reverse mapping from encoded features of the examples to actual features of retained examples.

Tree nodes 111-114 form a decision tree that exactly or approximately reflects how the ML model classified/labeled examples 0-7 based on the values of their features A-C. Node 111 is the root of the tree. Each tree node 111-114 has a condition that is based on a feature, a relational operator, and a split value.

For example, root node 111 has B>2 as a condition that detects whether feature B is greater than 2. A decision tree may operate as a classifier. Any of examples 0-7 may be more or less accurately classified by descending through the tree according to how the example does or does not satisfy conditions within the tree during descent.

Classification of an example begins at root node 111 and, by data driven traversal based on conditions, may end at a leaf that indicates a classification. Leaves are shown as round rectangles at the bottom of the tree. At least one of examples 0-7 descends to each leaf. For example, the leaf that says positive 0, 2 classifies/labels examples 0 and 2 as positive.

Descent of example 4 from root node 111 to the rightmost leaf occurs as follows. The value of feature B for example 4 is 2. Thus, example 4 does not satisfy the condition of root node 111. Thus, descent of example 4 traverses to node 113 whose condition is an inequality, C< >32.1.

The value of feature C for example 4 is 32.1. Thus, example 4 does not satisfy the condition of node 113. Thus, descent of example 4 traverses to the rightmost leaf that indicates a positive label.

The contents of the decision tree reflects the relative importance of features A-C based on their influence on classification. The condition of root node 111 is based on the most influential feature. Feature influence decreases the further is a node from root node 111. For example, feature B may be the most important, and feature C may be the least important. However, distance from the root is not the only indicator of the importance of a feature. Feature importance may also depend on how well the feature splits the samples at each node, such as measured as impurity, or the number of tree nodes that the feature appears in, such as when the feature is more complex and is involved in many fine-grained splits.

For example in a much larger tree with many more levels than shown, feature A may be in level X but only in a single node, whereas feature B might be in level X+1, but in many nodes at that level. There are various ways to compute feature importance, and as explained later herein, one way is to compute the weighted sum of the impurity of a node and the fraction of samples that the node is responsible for splitting. Thus, a feature that appears in many nodes (i.e. splitting enough samples) could have higher importance than a feature that appears in fewer nodes at a level closer to the root, thereby splitting a larger number of samples per node. For example, a feature that is in the root node could also be in another split node near the leaves of the tree. In an embodiment, overall importance of a feature takes into account all nodes that the feature appears in.

Feature importance is based on quantified information gain of the condition, which depends on the feature, operator, and split value of the condition. The more effective a condition is at separating a group of examples into two subsets of greater homogeneity of classification, the greater is the information gain. For example, the condition of root node 111 is the best at separating all examples 0-7 into positives and negatives.

For example, node 112 represents mostly positive examples, and node 113 represents mostly negatives. The rows shown with node 112 are as follows. The top row says 0, 2, 6, 7 to indicate that examples 0, 2, 6, and 7 satisfy the condition of root node 111.

The next row of node 112 says 3 pos+1 neg to indicate that three of examples 0, 2, 6, and 7 are positive and one is negative. The next row of node 112 says positive to indicate that the predominant label of examples 0, 2, 6, and 7 is positive. Three quarters of node 112's examples are positive, which is a frequency that should exceed some threshold ratio/percentage for a label to predominate.

If the threshold is less than half, then multiple labels may predominate. In this example, the threshold may be a third. For example, the examples of root node 111 are half positive and half negative, both of which exceed a third. Thus, root node 111 has both labels positive and negative.

Construction of the decision tree may occur according to the techniques and heuristics discussed above and later herein or according to other techniques. More significant is how a ruleset is generated from the tree, as discussed below. After the tree is constructed, classifications 130 may be discarded. The decision tree is used to create rules 121-128 as an initial ruleset. Rules 121-128 may operate as follows, although in practice, these are only an initial ruleset that may benefit from optimization that produces an optimized ruleset (not shown) that would be operated instead of the initial ruleset.

Rules 121-128 are a more or less reduced set (compared to an exhaustive elaboration of all features and all feature values) of decision rules that may be demonstrably used in either of two scenarios, although in practice, optimized rules derived from these rules would instead be used. Rules 121-128 may be used to predict how the ML model would classify an unfamiliar example. More importantly, rules 121-128 may be used to explain why the ML model already classified an (unfamiliar or familiar) example with a particular label. In other words, rules 121-128 may demonstrably provide ML explainability (MLX) for the ML model, although in practice, optimized rules derived from these rules would instead be used.

Each of rules 121-124 has a condition and a label, although only some rules are shown with labels. For example if rule 121 were to be generated by itself, instead of within a ruleset, then rule 121 might be expressed as IF B>2 THEN POSITIVE. However, rules in the ruleset are arranged in levels (e.g. 1-2), such that rules are nested. Thus, rule 121 is not used to indicate POSITIVE, but is instead used to select a subset of nested rules 123-126 in a next level (e.g. 2) for further evaluation. Thus, rule 121 is not actually dispositive, but instead operates as a precondition that, when child rules 123-126 are subsequently evaluated, can result in a classification of either POSITIVE or NEGATIVE, depending on which of rules 123-126 is satisfied. For example, rule 125 may classify a sample as NEGATIVE although not expressly shown as such. Rule generation, including generation of conditions and selection of labels, is discussed later herein.

Nested rule levels may operate as follows. For example, rule 122 and rule 128 may be applied in sequence to explain why example 3 is negative. For example, rule 122 and rule 128 indicate that the ML model classified example 3 as negative without considering feature A.

Whereas, rule 123 indicates that feature A was considered for classifying example 7 as negative. It may be counterintuitive that both of examples 3 and 7 could be negative and yet different features were used for classifying examples 3 and 7. For example, examples 3 and 7 may seem dissimilar to a human at first glance. Thus, rules 121-128 can achieve counter-intuitive explanations, thereby substantially demystifying the operation of the ML model.

Construction of rules 121-128 from tree nodes 111-114 occurs as follows. Rules 121-128 may be created in multiple levels, such as 1-2. For example, nodes near root node 111 may contribute to rule level 1, and nodes near the leaves of the tree may contribute to level 2. Mapping tree nodes to rule levels is discussed later herein.

Each of rules 121-128 classifies examples with one label. For example, rule 128 detects negative examples. That label is copied from a tree node. For example, node 113 provides the label and condition of rule 128.

Root node 111 has multiple labels. A separate rule 121 and 122 are generated for each label of node 111.

A dashed line is shown as separating rule levels 1-2. Although not shown, a similar line could be drawn somewhere within the decision tree to show a separation between tree nodes that contribute to level 1 rules versus tree nodes that contribute to level 2 rules. For example, node 111 may contribute to rule level 1, and nodes 112-114 may contribute to rule level 2.

To generate rules in a level, such as 2, a rule for each of all possible labels (i.e., Positive and Negative) may be generated, unless a label has low statistical significance (e.g. impurity or frequency) as explained later herein, in which case that label is suppressed. Thus, each level of a ruleset may be generated.

For example, rule 122 may be generated from node 111, and rules 127-128 may be generated from node 113. In some cases, a rule may be generated not from a single tree node, but instead from a tree traversal path that has multiple nodes. For example, rules 125-126 combine tree nodes 112 and 114. That is, the logic of each of rules 125-126 may be based on a concatenation or other combination of the conditions of nodes 112 and 114.

Rules 121-128 are organized into levels 1-2, and the levels represent stages within a cascaded sequence of rules. For example in operation, rules 127-128 should be evaluated only after rule 122 executes with a satisfied condition. Thus, rules 127-128 may be lexically/logically nested within rule 122. Thus, rule 122 and rules 127-128 may be combined and presented to a user instead as combined "rules 122 and 127-128" as shown.

For example, rules 122 and 127-128 may be submitted to a rules optimizer (not shown) as separate rules, and the rules optimizer may then generate combined "rules 122 and 127-128". In an embodiment, a combined rule may be generated according to a multi-level format, such as a triplet such as {LEVEL 1 CONDITION, LEVEL 2 CONDITION, LABEL}. Instead of a triplet, a larger tuple having more conditions may be used when a ruleset has more than two levels.

Multiple rules may be generated for a tree node. For example, rules 123-124 are entirely based on node 112, and rules 125-126 are partially based on same node 112. A rule may be based on multiple tree nodes in a tree traversal path. For example, each of rules 125-126 is based on both of nodes 112 and 114.

Although not shown, a rule may be based on (e.g. much) less nodes than occur in a tree traversal path. For example in addition to level 2 rules 123-126 that are children of level 1 rule 121, there may be level 2 rule(s) (not shown) that are also children of rule 121 but only based on node 114. A rule may be based on multiple nodes that are not directly connected to each other, despite those nodes occurring in a same traversal path. For example, a node may have a child and a grandchild, and a rule may be based on the node and the grandchild, but not the child.

As discussed later herein, embodiments may have various heuristics that limit the number and complexity of rules that are generated from one tree traversal path. Such heuristics may be necessary because otherwise an embodiment may generate more or less combinatorically exhaustive rules for one traversal path based on combinations of varied amounts of tree nodes of the traversal path. Thus, mathematical combinatorics are implicated, which involves arithmetic factorials, which have more than exponential complexity.

As discussed later herein, a preferred embodiment post processes rules 121-128 for optimization (i.e. simplification), such as by a ruleset optimization algorithm. For example, rules 121-128 may be submitted as an initial ruleset as input to a minimax, branch and bound, or other combinatorial optimization algorithm. For example, an approximate local search and submodular maximization algorithm such as black box explanations through transparent approximations (BETA) may be used. BETA may take rules 121-128 as input and then greedily optimize that ruleset by iteratively proposing adding some synthetic rules and removing some initial rules until some desirability and/or convergence condition(s) are met, with a best next change of the ruleset selected during each of many iterations.

A combinatorial optimization algorithm other than BETA could instead be used to optimize the generated candidate ruleset. Generally, the optimization problem is similar to the knapsack problem, which is theoretically intractable. An optimizer, such as BETA, may have heuristics to mitigate computational complexity, which may yield optimized results whose quality is dependent upon the quality of the initial ruleset. Techniques discussed herein generate a better initial ruleset that can be used as input to the optimizer to finally generate a ruleset that is better optimized for requirements of usability and/or feasibility, such as a maximum complexity of a rule and/or a maximum number of rules.

Computer 100 may persist initial rules 121-128 to a file or transmit them over a computer network to a remote data sink. In an embodiment, computer 100 may present rules 121-128 or more likely, a subsequently derived optimized ruleset, to a user as raw text or as text visually nested and/or arranged into levels such as shown. In an embodiment, computer 100 may report an explanation that indicates which rules are applied to a given example to decide which label, including which features and/or feature values did or did not satisfy which split values.

2.0 Example Rule Generation Process

Figure 2:
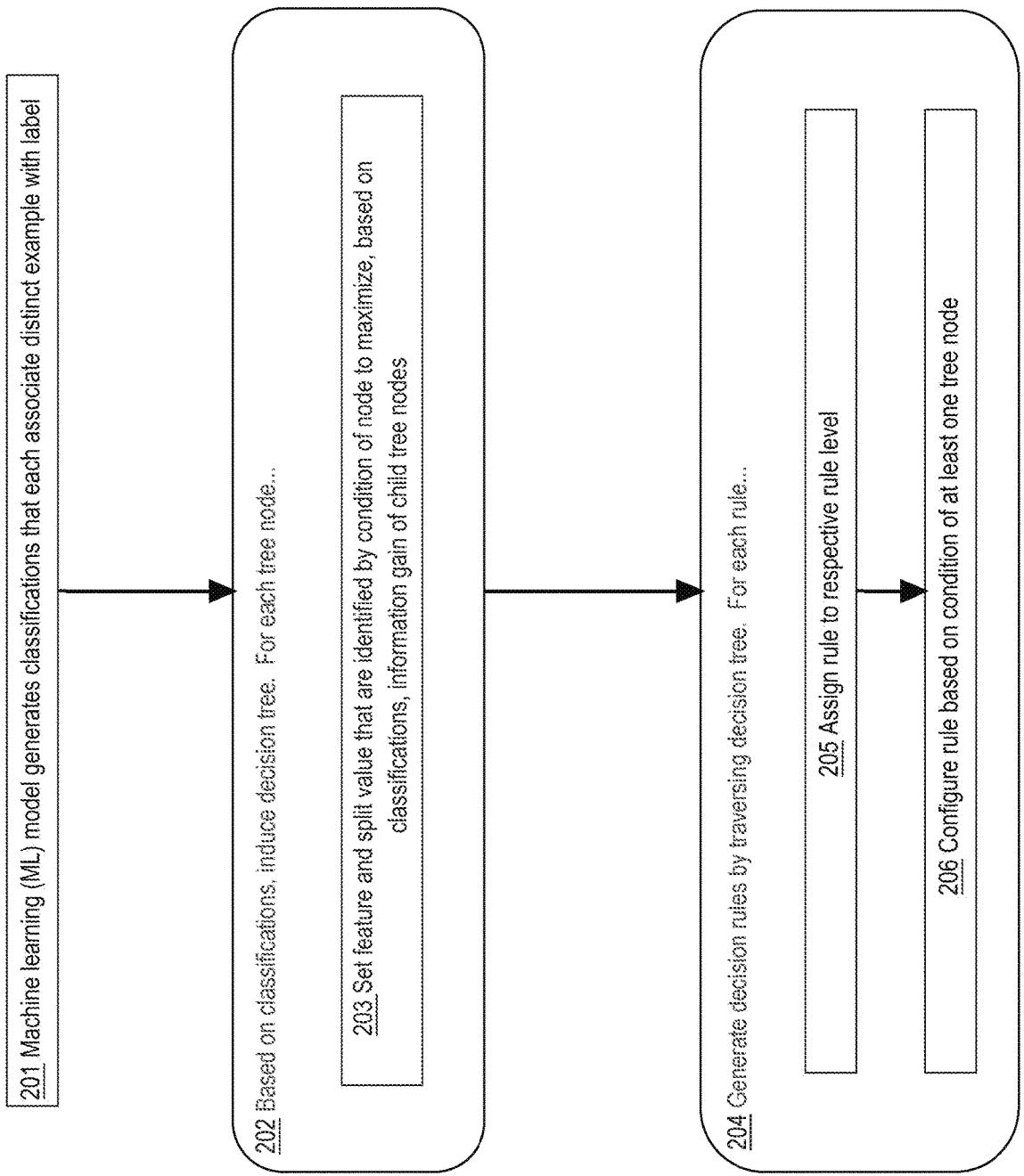
FIG. 2 is a flow diagram that depicts an example computer process for generating explanatory rules from a decision tree that is induced from classifications by a ML model.

FIG. 2 is a flow diagram that depicts computer 100 generating explanatory rules from a decision tree that is induced from classifications by a machine learning (ML) model, in an embodiment. FIG. 2 is discussed with reference to FIG. 1.

The process of FIG. 2 occurs as a sequence of three phases, which are classification, tree induction, and rule generation, shown as respective steps 201, 202, and 204. Although classification and induction are preparatory, typically induction and rule generation occur in rapid succession long after classification.

In step 201, a machine learning (ML) model classifies examples according to mutually exclusive labels. Typically, the ML model was trained before step 201, and the examples to classify are numerous and realistic. For example, production data in console logs or a data warehouse or other database may provide examples such as photographs or records.

In an embodiment, classification consumes encoded features of an example as input, such as a feature embedding, graph embedding, or contextual embedding. In an embodiment, input of an example is aggregated as a feature vector, such as a vector of integers. For example, each row (excluding the ID and label columns) of classifications 130 may be a separate feature vector.

Although the examples may remain available after step 201, that is not essential to techniques herein. In an embodiment, step 201 provides the features (e.g. vector) and classification label of each example to subsequent steps, regardless of whether or not the raw examples (e.g. photos) remain available. In an embodiment, step 201 occurs on a separate computer or at separate time than subsequent steps.

In an embodiment, labels and feature vectors are persisted in step 201 for reloading by a subsequent step. Step 201 is highly elastic. For example, all examples may be concurrently classified, such as one example per computer of a cluster.

The labels emitted by step 201 are needed because tree induction step 202 is supervised. That is, the labels influence the construction of the tree. Step 202 includes step 203 that is repeated for each node added to the tree. Although steps 202-203 construct a tree more or less in a particular way, tree construction may instead occur according to another technique or algorithm. For example, tree construction may or may not entail incremental induction such as by adding one node at a time to the tree. In other words, how the tree gets built is more or less irrelevant to how the initial rules are subsequently generated from the tree, such as by steps 204-206. Indeed, the ruleset construction techniques herein may, for example, operate upon a preexisting tree.

Step 203 sets the feature and split value that are identified by the condition of the current node. Feature and split value are selected to maximize, based on classifications, information gain of child tree nodes. Step 203 may or may not have raw examples available. However, features (e.g. vector) and a label of each example is sufficient.

Induction of a decision tree entails incremental addition of tree nodes, not incremental processing of examples. That is, the features and labels of many or all examples may be needed in order to add another node to the tree. Each tree node further subdivides the corpus of examples.

When adding the root node to the tree, all examples are considered. As nodes are added to the tree further from the root, the subset of examples to consider shrinks. For example, node 114 considers only examples 0, 2, and 7 as shown, even though the full corpus includes examples 0-7.

At the node being added, information gain is used to select a feature and split value with greatest significance for further dividing the subset of examples at that node. The mechanics and mathematics of information gain are discussed later herein.

How many nodes to add (e.g. one at a time), how many levels of nodes to add, and when to stop adding nodes to a given parent node depend on the implementation and may involve various thresholds. Ideally, the decision tree is exhaustively induced such that every leaf is added that could be reached by an example of the induction corpus. In practice, some leaves, nodes, or subtrees may be too statistically insignificant to add to the tree, which the various thresholds may decide, such as discussed elsewhere herein.

Thus, the induced decision tree may actually be abridged (i.e. somewhat incomplete) at or near the leaves. Incompleteness is compensated for by recording the predominate label(s) at each node, especially with the possibility of multiple predominate labels at a tree node, where one, some, or all predominate label(s) may represent an abridged (i.e. missing) leaf, node, or subtree. At a minimum at each node, step 203 records predominate label(s) and a condition based on a currently most significant feature and split value. Which feature is most significant depends on where within the tree is the current node. When a parent and child node have a same condition feature, those nodes should have different split values.

Other techniques that are not tree based may calculate split values based on simplifying statistics and/or affected by other conveniences such as formulaic range splitting such as for histogram binning, where the calculation of a split value is designed to be simple and perhaps even unsupervised (i.e. disregards classifications). Whereas, split value calculation herein during tree construction is highly sensitive to the information gain actually achieved.

Thus, split values herein are not distorted or hidden by concerns such as binning and need not expressly occur as an exact value of a feature of an example. Techniques herein find natural split values as revealed by actual probabilities. Techniques herein achieve, at least with respect to a partially constructed tree so far and its currently added tree node, the most accurate split values, with the most fidelity to actual classifications by the underlying ML model, thereby improving upon the state of the art. For example, state of the art unsupervised binning, such as without a tree or before tree construction, may yield a lower fidelity model than techniques herein. For example, unsupervised binning ignores interactions between multiple features and ignores localized subpopulations.

After step 202/203, the decision tree is fully configured and may subsequently be treated as immutable, and the data (e.g. feature vectors and per-example classifications) used for tree induction may be discarded. The decision tree is examined by the rule generation phase, shown as step 204, which also includes steps 205-206. Rule generation traverses the tree, potentially combining nodes of a subtree or tree traversal path, such that simplification occurs, somewhat akin to flattening the tree.

Steps 205-206 are repeated for each rule being generated. Step 205 segregates rules by rule level, which is imprecisely related to tree level as discussed later herein. The content of each rule depends on the content of a node or a tree traversal path, which is visited during tree traversal at step 206. The entire ruleset may be generated during at most a single traversal of the tree and, due to flattening, likely only a partial traversal of less than the entire tree. For example, some tree nodes (e.g. subtrees) may be ignored during ruleset generation.

Step 206 generates a rule by more or less copying the condition and predominate label of a node into the rule. When multiple labels predominate, a more or less similar rule may be generated for each of the predominate labels. Building a rule from a subtree is more or less akin to flattening some of the tree, such that the subtree may be treated as a single consolidated tree node, which may entail accumulating predominate labels and/or concatenating conditions of nodes of the subtree.

After steps 204/205-206, the candidate ruleset is ready to submit to a rule optimizer for further simplification as explained later herein. Rules may be encoded in various ways. However because the intended purpose of the rules is for explainability (e.g. human comprehension), human readable text according to some formal grammar may be preferred. In other words, the syntax of the rules should render the details of each rule more or less facially clear. In an embodiment, the rule optimizer ingests candidate rules that are not textual and/or are more or less not easily human comprehensible, and the rule optimizer then generates an optimized ruleset that has human readable text.

As discussed elsewhere herein, rules may be nested according to rule level. After ruleset generation, the decision tree may be discarded. The ruleset by itself may be the intended artifact of techniques herein. For example, a generated ruleset may be archived (e.g. as a text file) for later use, or immediately used to provide an explanation of a classification by an ML model, such as in production and/or with an unfamiliar example to classify.

3.0 Level Mapping

Figure 3:
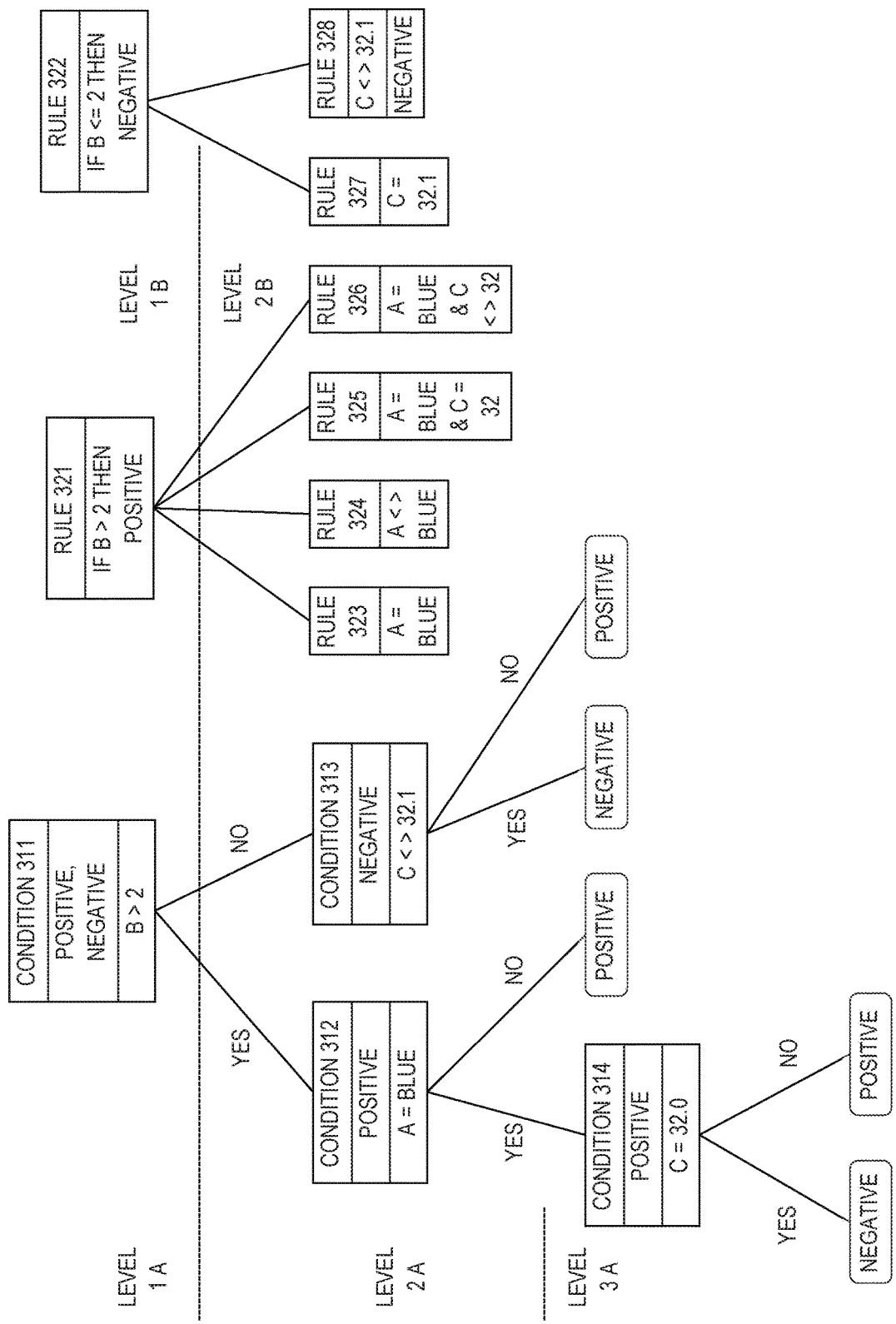
FIG. 3 is a block diagram that depicts an example computer that maps tree levels to rule levels.

FIG. 3 is a block diagram that depicts an example computer 300, in an embodiment. Computer 300 maps tree levels to rule levels. Computer 300 may be an implementation of computer 100.

As discussed above, rules such as 321-328 may be arranged into levels such as 1B and 2B, with rule level 2B having more rules than shown. FIG. 3 further arranges tree nodes (shown as conditions 311-314) of a decision tree into levels such as 1A, 2A, and 3A. For example, tree level 2A contains conditions 312-313. In an example not shown, a decision tree and its derived ruleset have a same count of levels, and mapping tree levels to rule levels is trivial (i.e. one-to-one).

However as shown, a tree and its derived ruleset may have different amounts of levels, which may require a custom mapping of tree levels to rule levels. In an embodiment, a mapping expressly divides the tree levels into as many contiguous subsets as there are rule levels. For example, a predefined mapping may specify that tree level 1A maps to rule level 1B, and tree levels 2A-3A as a range map to rule level 2B. However, a fully populated tree or at least an expected count of tree levels may be a prerequisite to declaring the mapping.

In an embodiment, a predefined mapping may be specified without a populated tree or even an estimate of tree level count. The predefined mapping may instead specify an amount of rule levels and a respective fraction/percentage of tree levels that should be mapped to each rule level. For example, the mapping as shown may specify that the top third of tree levels should be mapped to rule level 1B, and the bottom two thirds of tree levels should be mapped to rule level 2B. An embodiment may have a configurable maximum tree depth threshold during ruleset generation. For example if the threshold is two levels, then the tree is mapped to rule levels as if the tree only had two levels (i.e. 1A-2A), and additional tree levels (e.g. 3A) are ignored during ruleset generation.

Thus, the mapping may simply be a sequence of fractions as floating point numbers between 0 and 1 and summing to 1. For example, the shown mapping may be 0.33, 0.67. The ruleset may have two levels as shown, or may have more or fewer levels in other examples.

The decision tree may have many levels. Because simplification is one goal of MLX, techniques herein are designed to work well even when rule levels are few (e.g. two as shown) and tree levels are many (e.g. many more than shown). However, techniques herein also work well with other amounts of levels of rules and tree nodes.

To some extent, techniques herein more or less operate to flatten a decision tree with any amount of levels into a ruleset of a predefined (e.g. fewer) amount of levels. For example, a mapping of 0.33, 0.67 flattens any tree of any large depth into a ruleset of only two levels. Depending on the embodiment, a count of rule levels may be predetermined to be some small count (e.g. two) based on human ergonomics (e.g. visual comprehension) or based on limitations imposed by downstream processing such as a rule optimizer such as BETA as introduced above.

The mapping of tree levels to rule levels may be uneven, such that one rule level is derived from more (e.g. two more)

tree levels than another rule level. For example, each subsequent rule level may derive from (e.g. arithmetic, geometric, or exponential) more tree levels than the previous rule level. As explained above, a condition of a rule may be a concatenation of conditions of a traversal path of multiple nodes. In that case, the nodes that contribute to a rule level may be limited to tree levels that map to that rule level. An embodiment may limit how many nodes may contribute to any rule. For example if five tree levels map to one rule level, there may be a configurable limit of only two nodes contributing to a rule, and those two nodes need not be from contiguous levels. An embodiment may also have a configurable limit on how many rules can be generated for one tree traversal path.

As explained above, the fractions that are specified within the mapping should sum to one. Each fraction in the mapping's sequence of fractions should be positive (i.e. non-zero) until the fractions sum to one, after which there may be trailing zero fractions. For example, 1, 0, 0 is a valid mapping. When a fraction is zero, its rule level is a copy of the previous rule level. For example, 1, 0, 0 flattens the entire tree into a single level of rules, and that rule level is duplicated twice to yield a ruleset of three identical levels.

Various (e.g. machine or human) performance concerns may constrain the amount of nodes and/or levels in a tree and/or the amount of rules and/or levels in a ruleset. In an embodiment, any of those quantities may not exceed a respective threshold, perhaps imposed by downstream processing such as a rule optimizer such as BETA. In an embodiment, a threshold that limits a count of rules in a ruleset is based on a throughput of the rule optimizer. For example if rule optimization should not exceed two hours, then a rule optimizer that optimizes one hundred rules per hour may need a ruleset size threshold of two hundred rules.

4.0 Example Mapping Process

FIG. 4 is a flow diagram that depicts computer 300 mapping tree levels to rule levels, in an embodiment. FIG. 4 is discussed with reference to FIG. 3.

FIG. 4 depicts somewhat independent steps, such that which steps actually occur depends on the embodiment. However, when multiple of these steps occur, they occur in the relative ordering shown. For example, if steps 403-404 are skipped, then steps 401-402 and 405 still occur in the ordering shown.

Steps 401-402 are preparatory and establish a mapping of levels of a decision tree to levels of a ruleset. Multiple tree levels may map to a same rule level, and a tree level should not map to multiple rule levels. For example when there are multiple rule levels, mapping all tree levels to the first rule level and no tree levels to the other rule levels is valid.

Step 401 assigns tree nodes to tree levels based on distance from root node 311. Step 402 maps tree levels to rule levels, such as by fractions as explained above. An embodiment may limit tree traversal according to a configurable maximum tree depth threshold, such that deepest tree level(s) are ignored during rule generation.

Step 403 occurs during rule generation. A decision tree may have many more levels than its ruleset has. Multiple tree levels may map to a same rule level.

For example, tree levels 2A and 3A may map to rule level 2B. In that case, conditions of nodes of levels 2A and 3A may be concatenated into a condition of a rule of level 2B. For example, conditions 312 and 314 of a same tree traversal path may be concatenated to generate the condition of rules 325-326 as shown.

Step 404 may post process the generated ruleset. As explained above, a rule optimization algorithm such as BETA may refactor the ruleset to decrease its complexity, such as by removing less significant rules such as a rule that is more or less redundant to the rest of the ruleset. For example, the initial ruleset may be externalized in a rule format that BETA ingests. BETA may emit an optimized ruleset that can replace the initial ruleset, more or less without loss of explainability.

Steps 401-404 may occur in a development laboratory. Step 405 may occur at a production deployment. For example, step 405 may be preceded by storing and then reloading the ruleset in a different environment.

Various scenarios may include step 405. For example, customer assistance, compliance, or auditing may be involved. One scenario may be manually driven, and another may be entirely programmatic (e.g. scripted).

In step 405, an already trained ML model may classify a new example that may be unfamiliar (e.g. recently occurring in a live environment). The same features (e.g. vector) that stimulate the ML model to classify the new example may also be reused to invoke the ruleset. Applying rules may cascade through the rule levels according to rule condition evaluations of previous levels.

The traversal sequence of rules and their conditions may be used as an explanation of why the ML model classified the new example with a particular label. Thus, step 405 may classify a new example and then provide an explanation of how the classification occurred. In an embodiment, classification and explanation occur separately, such as at separate times and/or on separate computers. Thus, the ruleset may be used in a post mortem fashion to diagnose a past classification by the ML model. For example when a ML classification is eventually noticed as aberrant or injurious, an explanation may be forthcoming.

5.0 Information Gain

FIG. 5 is a block diagram that depicts an example computer 500, in an embodiment. Computer 500 populates a decision tree based on entropy and non-binary labels. Computer 500 may be an implementation of computer 100.

The label column of classifications 520 shows a non-binary classification (i.e. more than two distinct labels). However, the shown decision tree remains a binary tree as an earlier figures, such that each node has at most two child nodes. For example, nodes 512 and 514 are children of root node 511.

For compactness of drawing, the decision tree of FIG. 5 is visually rotated one eight of a counterclockwise rotation. Thus, the horizontal rows of the visual arrangement of nodes 511-517 do not reflect the logical levels that were introduced above. For example, nodes 512 and 514 actually are in a same logical level, and nodes 512-513 actually are in different logical levels.

The shown notation for the decision tree and its nodes 511-517 is the same as in FIG. 1, except for the following changes. Because there are three labels, some nodes may represent examples for three labels. For example, root node 511 has a classifications row that says 3 PA+3 FA+2 IG to indicate three examples labeled pass, three examples labeled fail, and two examples labeled ignore.

Unlike FIG. 1, root node 511 (and nodes 512-517) has a Gini row that indicates a Gini impurity index value. In information theory there are various probability statistics that more or less measure or approximate informational entropy and thus can be used to measure information gain that would be achieved by splitting a population having different labels. Some of those various metrics may be calculated as follows.

6.0 CALCULATIONS

FIG. 6 depicts calculation of information gain, in an embodiment. FIG. 6 is discussed with reference to FIG. 5.

The frequency (i.e. probability) of label j within a population is denoted as $P_j$. The entropy of the population of examples at a tree node is calculated as $-\Sigma P_j \log P_j$. Entropy is the basis for calculating information gain, per the formula of FIG. 6 that denotes the example populations of a parent node, left child node, and right child node respectively as $D_p$, $D_{left}$, and $D_{right}$, and their respective population sizes as $N_p$, $N_{left}$, and $N_{right}$. Techniques herein, with or without additional techniques such as minimum description length principle (MDLP), may use information gain to optimize a decision tree and its conditions.

Exactly measuring information gain is based on calculating entropy, which is based on computationally intensive logarithmic functions. Gini impurity index is a computationally efficient approximation of entropy that is instead calculated as Gini=$1-\Sigma P^2$, which accelerates tree construction. As shown, Gini is calculated at each of nodes 511-517. For example, root node 511 has eight examples, of which three pass, three fail, and two are ignored as shown. Gini for node 511 is $1-((3/8)^2+(3/8)^2+(2/8)^2)=0.656$ as shown.

A decision tree may have many more levels and nodes than shown, and the explanatory value of the nodes decreases based on distance from the root node. Nodes near the leaves of the tree, while accurately representing some minor classification criteria, may be more or less insignificant. Insignificant nodes are burdensome for time, space, and awareness by a human and/or machine and, thus, may effectively be more or less noise. For example, a node that can correctly classify only one example of thousands may be more or less noise for some purposes.

A threshold for an impurity metric such as Gini may be used to recognize and more or less disregard an insignificant subtree of nodes. For example if the Gini impurity of a node falls below a threshold such as 0.5, the predominate label(s) of the node may be used and the node and its subtree further disregarded. When such a node has multiple predominate labels, a rule may be generated for each predominate label.

For example, the Gini of node 512 may be too low, and two rules may be generated. One rule may classify as passing when feature B=4, and a sibling rule may instead classify as failing for the same B=4 condition. Nodes 512-513 as a subtree may further be disregarded, thereby often decreasing how many rules arise, especially if the subtree has more nodes than shown. In an embodiment that supports multiple (e.g. ambiguous, conflicting, and/or probabilistic) classifications, instead of generating a rule for each of multiple predominate labels of a node, a single rule may be generated that indicates all of the predominate labels as being possible.

7.0 Example Implementation

The following Python pseudo-code provides an example embodiment of candidate ruleset generation based on an already available decision tree. The generated ruleset should be subsequently submitted to a rule optimizer for refinement.

Function generate_candidate_rulesets is a harness that may be invoked to generate a ruleset from a tree. Function rule_gen recursively descends in post order traversal through the tree to generate rules that are structured according to a mapping of tree level to rule level. Function get_all_labels gathers predominate labels at a current tree node. Functions append_all_rule_history_combinations concatenates conditions to approximate flattening a subtree.

```
0:   def generate_candidate_rulesets(tree, feature_names,
1:       max_depth, level_factor, impurity):
2:     rule_sets = [len(level_factor)][ ]
3:     level_depths = calc_levels(max_depth, level_factor)
4:     rule_gen(tree, level_depths, max_depth, impurity,
5:         0, 1, [ ], rule_sets)
6:     return rule_sets
7:
8:
9:   def rule_gen(tree, level_depths, max_depth, impurity,
10:      node, depth, prev_rules, rule_sets):
11:    if is_not_leaf(tree, node) and depth < max_depth:
12:       name, split, max_label, imp = get_node_info(tree,
13:                                                   node)
14:       level_idx = get_level_idx(level_depths, depth)
15:       left_rule = (name , <=, split)
16:       right_rule = (name, >, split)
17:
18:       rule_labels = get_all_labels (tree, node)
19:       if imp < impurity:
20:          rule_labels = max_label
21:
22:       append _all_rule_history_combinations(rule_sets,
23:       prev_rule, left_rule,
24:       right_rule, rule_labels)
25:
26:       left_prev_rules = [ ]
27:       if depth != level_depths[level_idx]:
28:          left_prev_rules = prev_rules + left_rule
29:       rule_gen(tree, level_depths, max_depth, impurity
30:            left_child (tree, node), depth + 1,
31:            left_prev_rules, rule_sets)
32:
33:       right_prev_rules = [ ]
34:       if depth != level_depths[level_idx]:
35:          right_prev_rules = prev_rules + right_rule
36:       rule_gen(tree, level_depths, max_depth, impurity,
37:            right_child(tree, node), depth + 1,
38:            right_prev_rules, rule_sets)
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
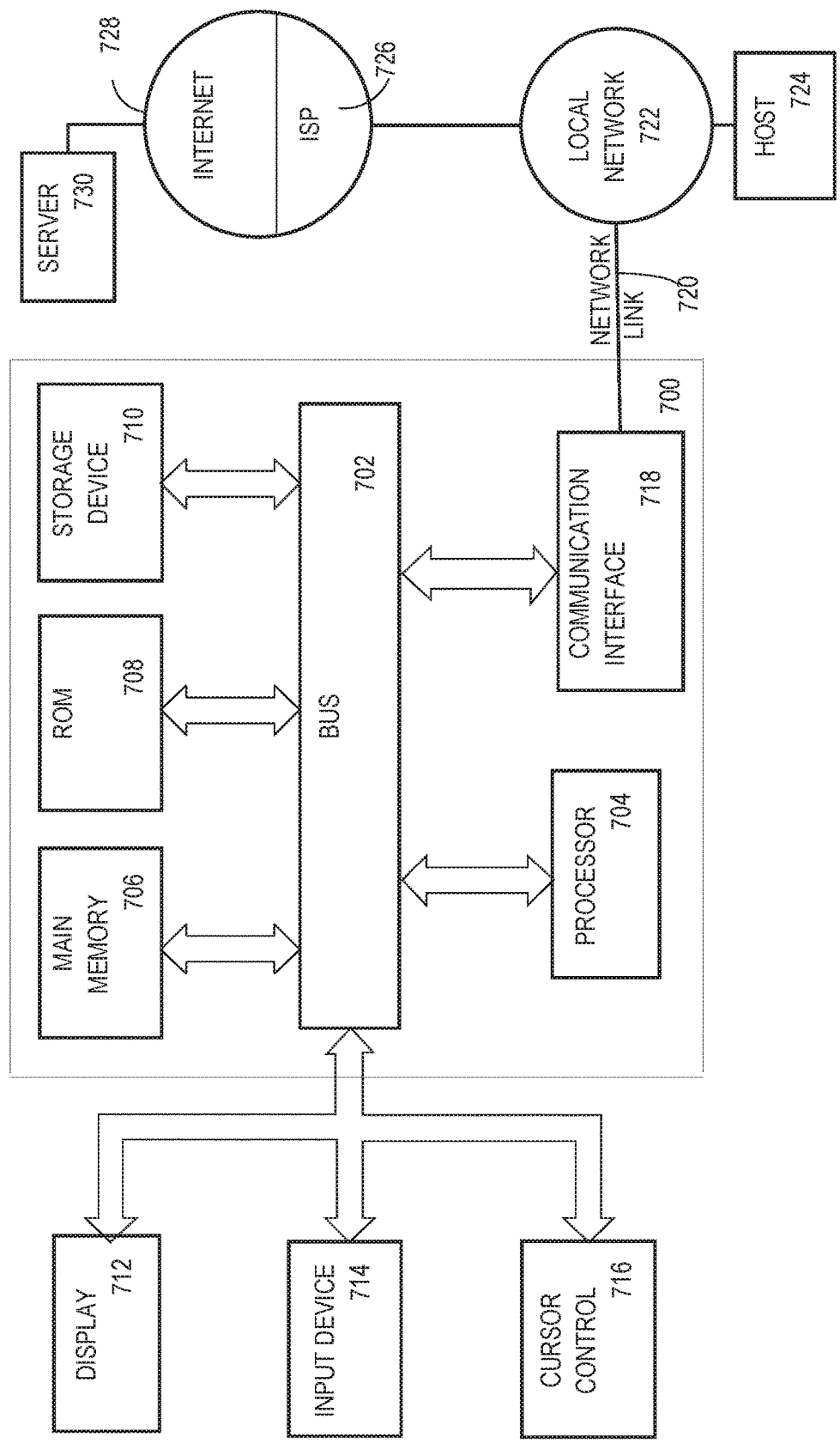
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
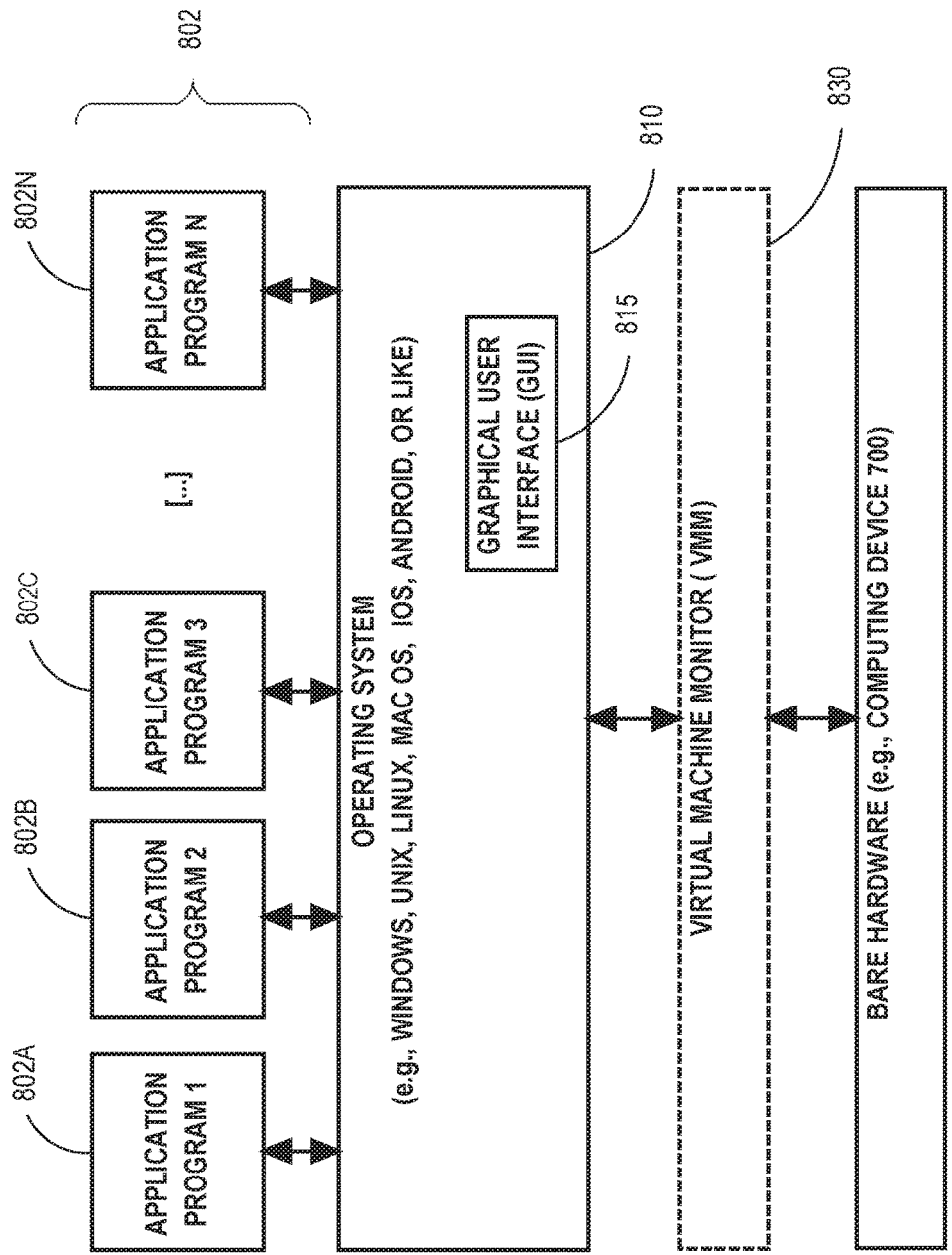
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programming languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L-1 to a layer L. Given the number of neurons in layer L-1 and L is N[L-1] and N[L], respectively, the dimensions of matrix W is N[L-1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L-1 to L. An activation neuron represents an activation function for the layer that includes the activation function. An activation neuron in layer L corresponds to a row of weights in a matrix W for the edges between layer L and L-1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
a machine learning (ML) model generating a plurality of classifications, wherein each classification associates a distinct example of a plurality of examples with a label of a plurality of labels;
defining a predefined mapping of a sequence of rule levels to a sequence of numeric fractions;
after said defining the predefined mapping of the sequence of rule levels, obtaining a decision tree that, based on the plurality of classifications, contains a plurality of tree nodes that are logically arranged into a sequence of tree levels, wherein:
each tree node of the plurality of tree nodes comprises: one or more labels of the plurality of labels, a condition that identifies a feature of a plurality of features of the plurality of examples, and a split value for the feature, and
when the tree node has child tree nodes, then the feature and the split value that are identified by the condition of the tree node are set to maximize, based on the plurality of classifications, information gain of the child tree nodes;
associating, based on said sequence of numeric fractions of the predefined mapping of the sequence of rule levels, each rule level of said sequence of rule levels with a respective portion of said sequence of tree levels;
generating, based on said sequence of numeric fractions of the predefined mapping of the sequence of rule levels, a candidate plurality of decision rules by traversing the decision tree, wherein:
each decision rule of the candidate plurality of decision rules contains a label of the plurality of labels and a condition of at least one tree node of the plurality of tree nodes,
each decision rule of the candidate plurality of decision rules is assigned to a respective rule level of the sequence of rule levels;
generating, by a rules optimizer, an optimized plurality of decision rules from the candidate plurality of decision rules.

2. The method of claim 1 wherein:
each of said plurality of tree nodes is assigned to a respective tree level of said sequence of tree levels;
said sequence of rule levels consists of at least one selected from the group consisting of:
two rule levels and fewer rule levels than said sequence of tree levels.

3. The method of claim 2 wherein said generating the candidate plurality of decision rules comprises generating a rule based on a subset of said plurality of tree nodes of multiple tree levels that are not contiguous.

4. The method of claim 1 wherein said sequence of numeric fractions sums to one.

5. The method of claim 1 wherein said sequence of numeric fractions contains a value that is zero.

6. The method of claim 1 wherein said sequence of rule levels comprises a particular rule level and a different rule level that is associated with a respective portion that has at least two more tree levels than a respective portion that is associated with said particular rule level.

7. The method of claim 1 wherein said generating said candidate plurality of decision rules comprises generating at least one decision rule based on only one respective feature of the plurality of features, wherein said condition of a root tree node of said plurality of tree nodes does not identify said one respective feature.

8. The method of claim 1 wherein:
said generating said candidate plurality of decision rules comprises generating a particular rule for a tree node by concatenating conditions of at least a subset of tree nodes of said plurality of tree nodes;
said subset of tree nodes consists of tree nodes in said respective portion that is associated with a rule level of said sequence of rule levels that contains said particular rule.

9. The method of claim 1 further comprising:
processing a new sample by a trained machine learning model to obtain a result;
reporting conditions of rules of the optimized plurality of decision rules that were most significant to the trained machine learning model to obtain the result.

10. The method of claim 9 wherein said conditions comprise a subset of said plurality of features.

11. The method of claim 10 wherein said conditions further comprises split values, of said subset of said plurality of features, that were most significant to the trained machine learning model to obtain the result.

12. The method of claim 1 wherein said maximize information gain comprises calculating an impurity of a tree node.

13. The method of claim 12 wherein:
said tree node has two child nodes;
said labels of the two child nodes comprises at least two labels of said plurality of labels;
said one or more labels of said tree node comprises only one label of said at least two labels when said impurity of said tree node does not exceed a threshold.

14. The method of claim 12 wherein said impurity comprises a classification error.

15. The method of claim 1 wherein said traversing the decision tree is limited to a configurable depth threshold.

16. The method of claim 1 wherein each decision rule of the candidate plurality of decision rules contains conditions of an amount of tree nodes that does not exceed a configurable threshold.

17. The method of claim 1 wherein said traversing the decision tree comprises:
traversing multiple traversal paths of the decision tree;
generating, for each traversal path of the multiple traversal paths, an amount of rules that does not exceed a threshold.

18. The method of claim 1 wherein a count of said candidate plurality of decision rules does not exceed a threshold.

19. The method of claim 18 wherein said threshold is based on throughput of said rule optimizer.

20. One or more non-transitory machine-readable media storing instructions that, when executed by one or more processors, cause:
- a machine learning (ML) model generating a plurality of classifications, wherein each classification associates a distinct example of a plurality of examples with a label of a plurality of labels;
- defining a predefined mapping of a sequence of rule levels to a sequence of numeric fractions;
- after said defining the predefined mapping of the sequence of rule levels, obtaining a decision tree that, based on the plurality of classifications, contains a plurality of tree nodes that are logically arranged into a sequence of tree levels, wherein:
  - each tree node of the plurality of tree nodes comprises: one or more labels of the plurality of labels, a condition that identifies a feature of a plurality of features of the plurality of examples, and a split value for the feature, and
  - when the tree node has child tree nodes, then the feature and the split value that are identified by the condition of the tree node are set to maximize, based on the plurality of classifications, information gain of the child tree nodes;
- associating, based on said sequence of numeric fractions of the predefined mapping of the sequence of rule levels, each rule level of said sequence of rule levels with a respective portion of said sequence of tree levels;
- generating, based on said sequence of numeric fractions of the predefined mapping of the sequence of rule levels, a candidate plurality of decision rules by traversing the decision tree, wherein:
  - each decision rule of the candidate plurality of decision rules contains a label of the plurality of labels and a condition of at least one tree node of the plurality of tree nodes,
  - each decision rule of the candidate plurality of decision rules is assigned to a respective rule level of the sequence of rule levels;
- generating, by a rules optimizer, an optimized plurality of decision rules from the candidate plurality of decision rules.

21. The one or more non-transitory machine-readable media of claim 20 wherein:
- each of said plurality of tree nodes is assigned to a respective tree level of said sequence of tree levels;
- said sequence of rule levels consists of at least one selected from the group consisting of: two rule levels and fewer rule levels than said sequence of tree levels;
- said generating the candidate plurality of decision rules comprises generating a rule based on a subset of said plurality of tree nodes of multiple tree levels that are not contiguous.

22. The one or more non-transitory machine-readable media of claim 20 wherein said generating said candidate plurality of decision rules comprises generating at least one decision rule based on only one respective feature of the plurality of features, wherein said condition of a root tree node of said plurality of tree nodes does not identify said one respective feature.

23. The one or more non-transitory machine-readable media of claim 20 wherein:
- said maximize information gain comprises said instructions further causing calculating an impurity of a tree node;
- said impurity comprises and a classification error.

* * * * *

UNITED STATES PATENT AND TRADEMARK OFFICE
CERTIFICATE OF CORRECTION

| | | |
|---|---|---|
| PATENT NO. | : 11,531,915 B2 | Page 1 of 2 |
| APPLICATION NO. | : 16/359256 | |
| DATED | : December 20, 2022 | |
| INVENTOR(S) | : Hetherington et al. | |

It is certified that error appears in the above-identified patent and that said Letters Patent is hereby corrected as shown below:

On the Title Page

On page 2, Column 1, Item (56) under Other Publications, Lines 13-14, delete "Seletion" and insert -- Selection --, therefor.

On page 2, Column 1, Item (56) under Other Publications, Line 19, delete "AJoint" and insert -- A Joint --, therefor.

On page 2, Column 1, Item (56) under Other Publications, Line 35, delete "Continous" and insert -- Continuous --, therefor.

On page 2, Column 2, Item (56) under Other Publications, Line 13, delete "Algotithm" and insert -- Algorithm --, therefor.

On page 2, Column 2, Item (56) under Other Publications, Line 29, delete ""ExplainableArtificialIntelligence:" and insert -- "Explainable Artificial Intelligence: --, therefor.

On page 2, Column 2, Item (56) under Other Publications, Line 30, delete "Visualizingand" and insert -- Visualizing and --, therefor.

On page 2, Column 2, Item (56) under Other Publications, Line 52, delete "Interpretablity"," and insert -- Interpretability", --, therefor.

In the Specification

In Column 15, Line 5, delete "$P_1$." and insert -- $P_j$. --, therefor.

In Column 15, Line 6, delete "$-\Sigma P_j \log P_j$." and insert -- $-\Sigma P_j \log P_j$. --, therefor.

In Column 16, Line 13, delete "(name ," and insert -- (name, --, therefor.

Signed and Sealed this
Twenty-sixth Day of September, 2023

*Katherine Kelly Vidal*

Katherine Kelly Vidal
*Director of the United States Patent and Trademark Office*

CERTIFICATE OF CORRECTION (continued)
U.S. Pat. No. 11,531,915 B2

In Column 21, Line 51, delete "C #," and insert -- C#, --, therefor.

In Column 23, Line 32, delete "and or" and insert -- and/or --, therefor.

In Column 23, Line 55, delete "an" and insert -- and --, therefor.

In the Claims

In Column 28, Line 33, in Claim 23, delete "comprises and a" and insert -- comprises a --, therefor.